United States Patent
Dandliker

[11] 3,913,559
[45] Oct. 21, 1975

[54] CONSTANT TEMPERATURE DEVICE

[75] Inventor: Walter B. Dandliker, La Jolla, Calif.

[73] Assignee: Kay Laboratories, Inc., San Diego, Calif.

[22] Filed: Feb. 7, 1972

[21] Appl. No.: 223,966

[52] U.S. Cl. .................... 126/263; 44/3 R; 128/403
[51] Int. Cl.² .......................... F24J 1/00; F24J 3/04
[58] Field of Search .................. 126/263; 62/4, 530;
44/3 R; 128/399, 403, 82.1

[56] References Cited
UNITED STATES PATENTS

| | | | |
|---|---|---|---|
| 1,786,842 | 12/1930 | Hannach | 62/4 X |
| 2,916,886 | 12/1959 | Robbins | 126/263 X |
| 3,066,847 | 12/1962 | Fortune | 62/4 X |
| 3,074,250 | 1/1963 | Everett | 62/530 |
| 3,149,943 | 9/1964 | Amador | 62/4 |
| 3,175,558 | 3/1965 | Caillouette et al. | 126/263 X |
| 3,493,986 | 2/1970 | Erwin | 126/263 X |

Primary Examiner—Carroll B. Dority, Jr.
Assistant Examiner—Ronald C. Capossela
Attorney, Agent, or Firm—Ellsworth R. Roston

[57] ABSTRACT

A portable constant temperature apparatus comprising a container having walls which are sealed to each other at least along their marginal regions to form at least one independent compartment. A chemical having a capability of assuming a substantial latent heat of fusion at a temperature corresponding to that desired for the constant temperature apparatus is disposed within the compartment. The chemical can then be heated to its melting temperature at which point it will assume its latent heat of fusion as it transforms into a liquid. When applied to a relatively cold object, it will give up this same latent heat of fusion at the same constant temperature as it transforms back to the solid state. Alternatively, the chemical can be cooled to its freezing point at which temperature it will liberate its latent heat of fusion as it transforms to a solid. When applied to a relatively warm object, it will absorb this same latent heat of fusion as it transforms back to the liquid state.

This portable means for providing an object with a considerable amount of heat or cold at a constant temperature is of substantial therapeutic value when applied to the body of a human being. The constant temperature means is preferably used with a hot or cold pack which is activated to impart heat or cold to the constant temperature apparatus.

11 Claims, 8 Drawing Figures

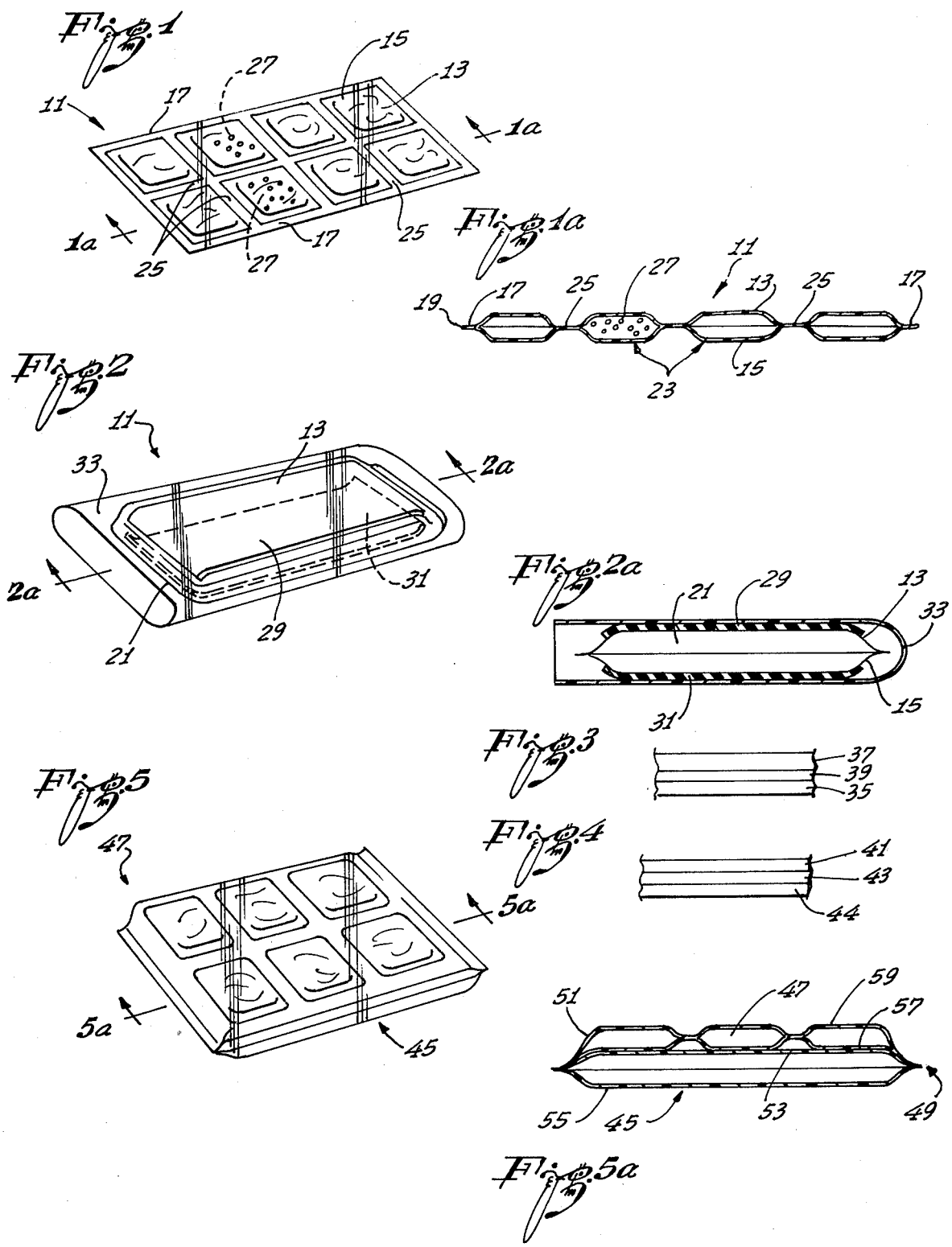

CONSTANT TEMPERATURE DEVICE

BACKGROUND OF THE INVENTION

1. Field of the Invention

This invention relates generally to portable apparatus capable of imparting a substantially constant temperature to an object over an extended period of time.

2. Description of the Prior Art

The prior art includes electric heating pads comprising a loop of high resistance wire which is disposed in a sinuous path in a single plane. The loop is typically sandwiched between two layers of soft material such as cotton. The layers and the loop are then enclosed within a case with the ends of the loop extending through the case. The ends of the loop are connected through an electric cord to an outside electrical source which drives a current through the cord and the high resistance loop. Where sufficient power is available, the high resistance wire assumes a relatively high temperature.

A thermostat is required to keep the heating pad within a desired range of temperatures and also to prevent the loop from melting. This constant temperature device can be applied to an object such as the body of a human being. In some cases a cloth covering has been provided for enclosing the container and the covering has been removable so that it can be cleaned.

It is clear that these electrical heating pads incorporate the typical problems that most electrical apparatus have. In the first place they are generally not portable. The electrical heating pad must be connected to an external electrical source such as the alternating current outlets which are available in most homes. If such a heating pad is applied to the body of a human being, that person must necessarily remain within the vicinity of the electrical outlet.

The electrical heating pads have a further deficiency in that they are susceptible to grounding and shorts as are all electrical appliances. For example, if any of the insulation on the electrical cord or the loop frays, the user is apt to experience an electrical shock or a burn due to the hot sparking which is associated with the shorting of electrical circuits. In either case such a malfunction can seriously injure the person using the heating pad.

It is significant to note that the electrical heating pads do not dissipate heat at a constant temperature. They are either completely on or completely off depending on the condition of the thermostat. For this reason they must operate within a range of temperatures.

In order to narrow the range of temperatures, the thermostat must be quite sensitive and must switch on and off frequently. While the user may be more comfortable with a narrow temperature range, wear on the thermostat may be excessive with the frequent switching. Thus, the comfort of the user must be compromised to prevent excessive wear on the thermostat. Typically, at the top of the temperature range, the user will be hotter than he desires and at the bottom of the range he will be cooler than he desires. If he responds to this discomfort by choosing a different temperature range on the thermostat, he will merely widen the temperature range and therefore compound his discomfort.

The electrical heating pad has a minimal heat capacity and for this reason turns cold soon after is is unplugged from the external electrical source. It is reusable only in the sense that it can be plugged into the electrical source at a future time to generate additional heat.

A further deficiency of the electrical heating pads is that they offer little comfort to an individual who must lie on the heating pad. The electrical wires which form the loop and the outlet cord are a source of discomfort if the user must press against them for any period of time.

Portable packs capable of imparting a cold temperature to an object have typically come in the form of rubber bags for enclosing ice water. These bags have required that the ice water be prepared and then loaded into the bag through an opening in the bag. This has necessarily been a messy and time consuming job. After the bag is filled, the opening must be resealed. When this is not satisfactorily accomplished, the bag typically leaks, spilling its contents over the user and his or her environment.

The prior art also includes reusable cold storage devices which typically enclose a coolable chemical in rigid containers. These devices have been intended for use in ice boxes and ice chests where direct contact with the objects to be cooled is not required. These devices are of little value for application directly to an object.

SUMMARY OF THE INVENTION

This invention provides a constant temperature apparatus for application to an object such as a human being. In the preferred embodiment, a flexible polyethylene container or bag is provided which encloses at least one chemical. The bag is heatsealed around its periphery to ensure that the chemical is retained by the bag. The bag can be compartmentalized thereby maintaining the homogeneous configuration of the enclosed chemicals. The bag also can be sandwiched between layers of insulating material and substantially enclosed by a disposable cover.

The chemicals enclosed by the bag have a melting point within the range of temperatures desired for the constant temperature apparatus. If hot temperature apparatus is desired, a chemical having a melting temperature above the surface temperature of the object should be chosen. Then the bag can be heated to permit the chemical to assume its latent heat of fusion. When applied to the object, the chemical will maintain a substantially constant temperature at its melting point as it imparts the latent heat of fusion to the object.

If cold temperature apparatus is desired, a chemical having a melting point below the surface temperature of the object should be chosen. The apparatus is then cooled and the chemical gives up its latent heat of fusion as it transforms into a solid state. Upon application to the object, the chemical will absorb its latent heat of fusion from the object at the constant temperature of its melting point as it transforms back into the liquid state.

The advantages associated with this constant temperature apparatus are significant. It is particularly noteworthy that the apparatus maintains a substantially constant temperature throughout its period of effective use. During the change of state, the chemicals in the apparatus maintain a temperature substantially equal to their melting temperature as the heat of fusion is transferred either to or from the object. This constant temperature also acts to extend the period of effective use of the apparatus. Although heat or cold may be imparted to the apparatus at a rapid rate over a short period of time, the constant temperature will typically enable the heat transfer from the apparatus to the object to take place at a slower rate and over a longer period of time. Effective periods of use in excess of 5 hours have been achieved.

It should also be noted that the apparatus can be used repeatedly. The heat transfer which takes place is not the result of a one-way chemical reaction but rather is a result of chemical transformation. This change of state can take place an unlimited number of times since there is no consumption of chemicals and no chemical reaction takes place.

It will also be noted that the apparatus is entirely portable and therefore is of particular value when the user cannot be restricted to a limited area. There are no electrical wires or thermostats connected to the apparatus so that malfunctions associated with such electrical systems are not encountered.

In situations where the user must lie upon the apparatus, a relatively fluid base is presented without the irritation of electrical wiring or ice cubes. The apparatus can be sandwiched between insulating sheets to control the heat transfer from the surfaces of the apparatus. It can also be enclosed within a disposable cover so that the user need only be in contact with a clean sterile surface.

The apparatus can be disposed in abutting relationship to a portable means for generating heat or cold. For example, hot or cold packs such as disclosed and claimed in copending application Ser. No. 809,870 filed on Mar. 24, 1969 now abandoned by Thomas E. Cornwall and Maurice A. Lynch, Jr. and assigned of record to the assignee of record of this application can be used. Such hot or cold packs are advantageous since they remain dormant until such time as heat or cold is to be generated. The hot or cold packs can then be easily activated to generate temperatures in excess of those desired for application to the object to be heated or below those desired for application to the object to be cooled. The apparatus included within this invention then regulates the temperature from the hot or cold pack to maintain the temperature desired to be applied to the object. In this manner, even the initial change of state can take place under portable conditions so that the user need not be in the vicinity of an external source of heat or cold. Thus, the apparatus and the source of heat or cold, such as the hot or cold pack, can be applied immediately even while the user is being transported. This is of particular importance when the user constitutes an infant whose body temperature is to be regulated.

BRIEF DESCRIPTION OF THE DRAWINGS

FIG. 1 is a perspective view of constant temperature apparatus constituting one embodiment of the invention;

FIG. 1a is a cross section view of the constant temperature apparatus and is taken substantially on line 1A—1A of FIG. 1;

FIG. 2 is a perspective view of the constant temperature apparatus sandwiched between insulating layers enclosed within a disposable cover;

FIG. 2a is a cross section view of the constant temperature apparatus and is taken substantially on line 2A—2A of FIG. 2;

FIG. 3 shows a laminate which can comprise one of the exterior walls of the constant temperature apparatus;

FIG. 4 shows a laminate which can comprise the other exterior wall of the constant temperature apparatus;

FIG. 5 is a perspective view of the constant temperature apparatus in combination with a hot or cold pack; and FIG. 5a is a cross section view of the apparatus shown in FIG. 5 and is taken substantially on line 5A—5A of FIG. 5.

Description of Preferred Embodiments

The present invention provides a portable constant temperature apparatus shown generally at 11 in FIGS. 1 and 1a. The constant temperature apparatus 11 has a first wall 13 and a second wall 15 which preferably are impermeable to fluid and capable of being bonded together. At least one of the walls 13 and 15 should be capable of rapidly equalizing a temperature differential across its surfaces. A flexible plastic such as polyethylene has proved satisfactory for this purpose. The first wall 13 and the second wall 15 are substantially coextensive with each other and each wall has a marginal region 17 around its periphery.

A means for bonding 19 adheres the first wall 13 to the second wall 15 at their marginal regions 17 and thus forms a container 21 wherein the first wall 13 comprises one side of the container 21 and the second wall 15 comprises the opposite side of the container 21. When a polyethylene material is used for the first and second walls 13 and 15, the bonding means 19 can consist of a heat seal. At least one chemical 27 can be disposed within the container 21. The materials used for the walls 13 and 15 and the bonding means 19 used to form container 21 should be capable of resisting any deterioration which may results from a reaction with the chemical 27.

In a preferred embodiment, the container 21 is divided into a number of compartments shown generally at 23 by a multiplicity of mutually criss-crossing seals 25. This configuration aids in maintaining the homogeneous nature of the chemicals 27 disposed within the compartments 23. The compartmentation also provides a safety feature since the puncture of any single compartment will not result in spilling the entire contents of the apparatus 11. The seals 25 can be formed by bonding the first wall 13 to the second wall 15 along lines which connect the marginal regions 17. The seals 25 should also be capable of resisting deterioration which may be caused by the presence of the chemicals 27 within the compartments 23. When the first and second walls 13 and 15 are composed of polyethylene, the seals 25 are preferably formed by heat sealing the walls together.

The chemical 27 disposed within the compartments 23 can have the following characteristics. First, the chemical 27 preferably has a melting temperature corresponding substantially to the desired operating temperature of the apparatus 11. Below this temperature the chemical 27 is preferably in a solid state and above this temperature the chemical 27 is preferably in a liquid state. Second, the chemical 27 is preferably capable of assuming a substantial latent heat of fusion as it transforms from a solid state to a liquid state. Higher latent heats of fusion will typically correspond to longer periods of constant temperature.

The chemical 27 can be a means for maintaining either a hot or cold temperature depending on the melting temperature of the chemical 27 and the temperature of the intended object. This can be appreciated with reference to the preferred operation of the apparatus. If the apparatus 11 is to be used for maintaining a substantially hot constant temperature to an object, a chemical having a melting temperature greater than the temperature of the object can be chosen. The apparatus can then be heated until the chemical 27 is transformed from the solid to the liquid state. During this transformation a substantial amount of heat, the latent heat of fusion, will be imparted to the chemical 27 at a substantially constant temperature, the melting temperature of the chemical 27. It is preferred that the heating be discontinued prior to the complete transformation of the chemical 27 so that the temperature of the apparatus 11 will not exceed the melting temperature of the chemical 27.

When this preferred apparatus is applied to the colder object, it will impart the latent heat of fusion to the object at its substantially constant melting temperature as it transforms from the liquid state to the solid state.

An apparatus which is intended to impart a constant cold temperature to an object will operate in a similar manner except that the latent heat of fusion will preferably be absorbed from the object. In such an apparatus the melting temperature of the chemical 27 will preferably be less than the temperature of the intended object. The chemical 27 may initially be in a liquid state in which case it may be necessary to cool the apparatus with an external source of cold to transform the chemical 27 to a solid state. During this transformation the chemical 27 can give up its latent heat of fusion to the source of cold at it substantially constant melting temperature. The apparatus is preferably removed from the source of cold prior to the complete transformation of the chemical 27 so that the temperature of the apparatus will not pass below the melting point of the chemical 27. When this preferred apparatus is applied to the hotter object, the latent heat of fusion of the chemical 27 will be absorbed from the object at the relatively colder temperature of its melting point. Thus it can be understood that the melting temperature of the chemical 27 is the constant temperature at which the apparatus 11 operates.

A preferred embodiment of the apparatus 11 is intended for use on objects such as infants who typically have surface temperatures below 30°C. In this embodiment, disodium monohydrogen phosphate dodecahydrate can be used for the chemical 27. This chemical has a melting temperature of substantially 36.1°C. Since this is the constant temperature at which heat is imparted to the object such as a human being, the apparatus constitutes a source of heat to the object.

In addition to this property disodium monohydrogen phosphate dodecahydrate has a relatively large latent heat of fusion of 279.5 joules per gram. This assures that the total heat capable of being dissipated to the object is large in comparison to the mass of the chemical 27. Since the heat of the apparatus 11 is imparted to the object at a substantially constant temperature, it is also imparted at a substantially constant rate. Practically speaking then, a relatively higher latent heat of fusion enables the apparatus 11 to be effective over a relatively longer period of time. Constant temperatures have been maintained for periods in excess of five hours.

The constant temperature apparatus 11 containing disodium monohydrogen phosphate dodecahydrate can operate in the following manner. An external source of heat can be brought into contact with the apparatus 11 while the disodium monohydrogen phosphate dodecahydrate is at least partially in a solid state. The heat imparted to the device can have the initial effect of raising the temperature of the apparatus to substantially 30°C. The temperature of the chemical remains constant at this melting point while it absorbs its heat of fusion and transforms from a solid to a liquid state.

It should be noted that any heat imparted to the disodium monohydrogen phosphate dodecahydrate upon its complete transformation to the liquid state has the effect of raising its temperature above 36.1°C. This is of particular importance since it is desirable that the apparatus 11 present a constant temperature to the object such as the infant throughout its period of use. For this reason, it is preferable that the temperature of the apparatus 11 not exceed the melting temperature of the chemical 27. This can be prevented most easily by removing the apparatus 11 from the external source of heat prior to the complete liquification of the chemical 27. One can also insure that the temperature of the apparatus will not exceed its melting point by limiting the output of the heat source so that it is not capable of melting all of the chemical 27. After it is heated, the apparatus 11 can be placed in contact with the infant and a relatively hotter temperature of substantially 34.5°C will be maintained while the latent heat of fusion is imparted to the infant.

It will be appreciated that the apparatus 11 can contain other compounds and mixtures each having a melting point which can provide the apparatus with a particular constant temperature over an extended period of time. Thus, the desired temperature of the apparatus 11 can be dictated by choosing the particular chemical 27 with reference to its melting temperature. The following table is illustrative of compounds and mixtures which can be used in the constant temperature apparatus 11. Each compound and mixture has chemical properties in addition to its melting point which makes it particularly adaptable to a given object. Many of the chemicals are adaptable for use in proximity to the human body.

| Inorganic Compounds | Melting Point (°C) | Heat of Fusion (joules per gram) |
| --- | --- | --- |
| Sodium chromate decahydrate | 23–30 | 164–151 |
| Cupric nitrate hexahydrate | 24.4 | 123 |
| Manganese nitrate hexahydrate | 25.8 | 120.5 |
| Barium iodide hexahydrate | 26.7 | |
| Calcium chloride hexahydrate | 29.92 | 170.5 |
| Sodium sulfate decahydrate | 31 | 214.5 |
| | 31.5 | 239 |

-Continued

| Inorganic Compounds | Melting Point (°C) | Heat of Fusion (joules per gram) |
|---|---|---|
| Potassium iron alum | 33 | |
| Hydroxylamine | 33.1 | |
| Zinc nitrate hexahydrate | 36.4 | 130 |
| Disodium monohydrogen phosphate dodecahydrate | 36.1 | 279.5 |
| Ferric nitrate hexahydrate | 36 | |
| Calcium bromide hexahydrate | 38.2 | |
| Ammonium iron alum | 40 | |
| Calcium iodide hexahydrate | 42 | |
| Calcium nitrate tetrahydrate (Alpha form) | 42.1 | 142.2 |
| Lithium bromide dihydrate | 44 | |
| Ferric nitrate nonahydrate | 47 | |
| Lithium borate (16 waters) | 47 | |
| Sodium bromide dihydrate | 50.7 | |
| $Na_3PO_4 \cdot H_3PO_4 \cdot 15H_2O$ | 55 | |
| Nickel nitrate hexahydrate | 56.7 | 152.5 |
| Sodium acetate tetrahydrate | 58 | |
| Cadmium nitrate tetrahydrate | 59.5 | 106 |
| Barium nitrate tetrahydrate | 60 | |
| Monosodium dihydrogen phosphate dihydrate | 60 | |
| Magnesium nitrate hexahydrate | 90 | 160 |
| Magnesium chloride hexahydrate | 116.7 | 172.5 |
| Sodium thiosulfate (hypo) | 200 | |
| Organic Compounds | | |
| Formamide | 3 | |
| Paraldehyde | 12.6 | 104.75 |
| Methyl succinate | 18 | 149.6 |
| Veratrol | 22.7 | 114.9 |
| Myristyl alcohol | 39 | |
| Cynamide | 41–42 | |
| Laruric acid | 43 | |
| Formanalide | 46 | |
| Methyl tartarate | 48 | |
| Thymol | 48.5 | 115 |
| Cetyl alcohol | 47 | 141.5 |
| Myristic acid | 53–54 | 198.7 |
| Methyl oxalate | 49.5 | 178.5 |
| Tristearin | 56 | 191 |
| Dipalmitin | 61 | |
| Palmitic acid | 55 | 164 |
| Tripalmitin | 65 | |
| Propionamide | 79 | |
| Methyl citrate | 79 | |
| Eutectic Compounds | | |
| Phenol 10% Aniline 90% | −11 | |
| Phenol 80% Aniline 20% | 15 | |
| Eutectic Mixtures | | |
| Potassium nitrate 10.9% Water 89.1% | −2.9 | |
| Magnesium sulfate 19% Water 81% | −3.9 | |
| Picric acid 36% Trinitrotoluene 64% | 60 | |
| Para toluidine Ortho nitrosophenol | 15.6 | |
| Metallic Eutectics | | |
| Rose's metal | 93.75 | |
| Wood's metal | 60.5 | |

A second embodiment of the invention is shown in FIGS. 2 and 2a. This embodiment is similar to the first embodiment except that there are no seams 25 separating the container 21 into compartments 23. The embodiment in FIG. 2, however, provides for a first insulating means 29 which is in contact with the first wall 13 substantially throughout its surface. Provision is also made for a second insulating means 31 which is in contact with the second wall 15 substantially throughout its surface. The first insulating means 29 can be used to moderate the temperature at which the apparatus 11 imparts heat to an object. With such a purpose, the first insulating means 29 preferably does not act to completely isolate the object from the heat being imparted by the apparatus 11.

The second insulating means 31 can be capable of preventing the dissipation of heat from the constant temperature apparatus 11 into the atmosphere. Since it is desirable that all the heat from the chemical 27 pass to the object, it is consequently desirable that no heat pass to the environment. For this reason, the second insulating means 31 should have relatively high insulating qualities.

The container 21 and the first and second insulating means 29 and 31 can be enclosed within a disposable cover 33 to provide a clean sterile surface. For economic reasons, the cover 33 may be constructed of a suitable material such as paper but a fabric could be used. It is apparent that the disposable cover 33 would have particular advantage within a hospital where sterility would be of prime importance.

As noted previously, the container 21 and the chemicals 27 enclosed therein are reusable. Advantage can be taken of this feature even in a hospital if the container 21 can be isolated from any source of dirt. The disposable cover 33 performs this function in the preferred embodiment.

The walls 13 and 15 of the container 21 can be constructed of laminates such as those shown in FIG. 3 and FIG. 4, respectively. The laminate shown in FIG. 3 comprise an interior layer 35, an exterior layer 37, and an intermediate layer 39 bonded therebetween. It is preferable that the interior layer 35 have the capability of being heat sealed. This will aid in the formation of the container 21 by the bonding means 19. Where a greater strength is desired for the first wall 13, the intermediate layer 39 can comprise a layer of flexible plastic such as a polyester designated by E. I. DuPont de Nemours under the trademark Mylar. The exterior layer 37 would preferably be the first insulating means 29 initially described with reference to FIG. 2. This insulating material 37 can moderate the temperature at which heat is transferred between the object and the apparatus 11.

The laminate shown in FIG. 4 can comprise an interior layer 41 of heat sealable flexible plastic such as polyethylene, an intermediate layer 43 of relative strong flexible plastic such as Mylar, and an exterior layer 44. In this configuration the laminate shown in FIG. 4 would preferably be used as the second wall 15 wherein the bonding means 19 could comprise heat sealing the interior walls 35 and 41 at their marginal regions 17 to form the container 21. The exterior layer 44 is preferably the second insulating means 31 shown in FIG. 2.

FIGS. 5 and 5a show a first means for chemically generating heat or cold 45 in combination with a second means for retaining the generated heat or cold 47. The first means for generating heat or cold 45 is enclosed within a first container 49 and the second means for retaining the heat 47 is enclosed within a second container 51. The first container 49 has an interior wall 53 and an exterior wall 55. Similarly, the second container 51 has an interior wall 57 and an exterior wall 59. The interior walls 53 and 57 can be disposed in substantial contact to facilitate the transfer of heat or cold from the container 51 to the container 49.

The first means for chemically generating heat or cold 45 can be the hot or cold pack disclosed in the copending application Ser. No. 809,870 now abandoned. The hot or cold pack therein described provides for a rupturable bag and at least two chemicals enclosed within the first container 49. One of the chemicals is initially enclosed by the rupturable bag. When the rupturable bag is broken the chemicals mix and react to give off either heat or cold depending on the chemicals chosen. The timing of the reaction can be controlled by the user who must rupture the bag to initiate the reaction.

In the embodiment shown in FIGS. 5 and 5a the second means for retaining the generated heat or cold 47 can be the constant temperature apparatus 11 substantially as shown in FIGS. 1 and 2. The combination of the means for generating heat or cold 45 and the constant temperature apparatus 11 is particularly advantageous since it provides for the portability of the entire heating apparatus. Since the constant temperature apparatus 11 begins transferring heat as soon as it is brought into contact with the external sources of heat or cold, it can be advantageous that the object be in proximity to the external source. In this manner most of the heat or cold present in the constant temperature apparatus 11 can be transferred to the object and not lost to the atmosphere. In cases where the external source of heat or cold is not portable, however, this preferred method of usage can restrict the object to the vicinity of the external source of heat or cold.

In some situations it is not advisable to limit the location of the object. For example, a newborn infant might benefit from the application of a source of constant temperature but it may not be advisable to move the infant into proximity with an external source of heat. Even an object which is originally in proximity to an external source of heat may require removal before the constant temperature device 11 can be fully heated.

It can also be appreciated that it may be desirable to apply the constant temperature apparatus to the object even as the apparatus is being heated by the external source of heat. If it is also important to move the object during the heating process, it can be of particular advantage to provide the constant temperature apparatus 11 in combination with a portable external source of heat or cold 45 as shown in FIG. 5. This combination can permit the constant temperature apparatus 11 to be applied to the object even as the apparatus is being heated, and can minimize the loss of heat to the atmosphere. The combination can be laid aside until it is needed at which time the rupturable bag can be broken and the constant temperature device applied to the object. Thus the apparatus 11 can be used even in areas which typically do not have more conventional means for providing an external source of heat or cold.

The first means 45 and the second means 47 can be bonded together to maintain their contiguous relationship but they are not bonded in a preferred embodiment. Since the second means 47 can be reused but the first means 45 cannot, it can be advantageous to provide for their separation so that the second means can be reused in conjunction with a new first means.

If the first means 45 is bonded to the second means 47, it is preferable that the amount of heat which the first means 45 is capable of generating not exceed that which would cause the second means 47 to rise above its melting point. In other words, a portion of the chemical 27 should remain in the solid state after the first means 45 has ceased generating heat. The heat generating can be controlled by limiting in the first means 45 the quantity of the chemicals which are available to generate heat or by providing an excessive amount of chemicals in the second means 47. This will ensure that, when the apparatus 11 is placed in contact with the object, its temperature will not exceed the melting point of the chemical 27.

The embodiment shown in FIG. 5 can also operate as a cold temperature apparatus but the first means 45 must be a source of cold, and the chemical 27 will preferably be in the liquid state prior to use. As the apparatus is cooled by the external source it will go through a first transformation to the solid state. Prior to the complete transformation of the chemical 27, the apparatus 11 can be placed in contact with the object. At the constant temperature of its melting point, the chemical 27 will then take its latent heat of fusion from the object as it goes through a second transformation back to the liquid state.

Based on the foregoing description, the advantages of the constant temperature device should be apparent. Of particular importance is the fact that the apparatus of this invention can impart heat to an object at a constant temperature. As noted, the temperature of the chemical 27 will not vary as long as it is releasing or assuming its latent heat of fusion. The release of heat or cold at this constant temperature may continue for as long as five hours.

It is also of particular importance that this source of constant temperature, which is capable of being applied to an object over an extended period, is portable. Furthermore, there are not electric cords to fray or otherwise malfunction in a manner which could injure the user or render the constant temperature apparatus 11 useless.

This invention is also reusable. All one need do is reheat or recool the constant temperature apparatus 11 in order to cycle the chemical 27 through its solid and liquid states. There is no restriction on the number of times these transformations can be accomplished.

An additional advantage is the fact that the constant temperature device is at least partially in liquid form throughout its entire use. An individual which is required to lay on the apparatus 11 will not be subjected to the discomfort associated with electrical cords but rather will lie upon a soft fluid cushion.

In combination with a means for generating heat or cold such as the combination shown in FIG. 5, the entire heating apparatus is portable. This can be of particular advantage when the object is not in proximity to an external source of heat or cold. A particular application might be found in the case of a newborn infant where, it might be of advantage to use the constant temperature apparatus even as the apparatus 11 is being heated by the heat source 45. The need to move the infant as soon as possible, of course, might necessitate that both the constant temperature apparatus 11 and the external source of heat or cold be portable.

In combination with the first means 45, the second means 47 would have a further advantage over the application of a heat or cold source directly to the object. Since the apparatus 11 will maintain a constant temperature while it is transforming from a solid to a liquid and from a liquid to a solid, the object will not experience the temperature fluctuations which would ordinarily occur if a heat or cold generating source were to be used without the constant temperature apparatus.

A source of a constant cool temperature has been disclosed which can be permanently sealed. It need not be filled with ice water each time it is used and no expensive screw tops are required. Furthermore, the flexible configuration of the container 21 and the materials used therein can permit the constant temperature apparatus 11 to be placed directly into contact with various objects over a substantial surface area.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A portable combination for generating and retaining heat or cold and imparting said heat or cold to an object at a constant temperature comprising:
    first means for generating heat or cold at temperatures having absolute magnitudes greater than the constant temperature;
    second means for retaining the heat or cold generated by said first means, said second means having characteristics for imparting said heat or cold to the object at the constant temperature for extended periods of time, the second means having properties of being recycled;
    a first container enclosing said first means, said first container having a first wall capable of readily passing heat;
    a second container enclosing said second means, said second container having first and second walls, said first wall of said second container being disposed in juxtaposition to the first wall of said first container, the first wall of the second container having properties of readily passing heat;
    the second wall of the second container having properties of being disposed in juxtaposition to the object to maintain the object at the constant temperature; whereby
    the heat or cold generated by said first means passes through the first walls of said first and second containers and is retained by said second means.

2. The combination as defined in claim 1 wherein:
    said first walls of said first and second containers are heat sealable and said first walls of said first and second containers are sealed at their peripheries; whereby
    said heat sealed walls are in contact substantially throughout their entire surface thereby facilitating the transfer of heat between said first and second containers.

3. The combination as defined in claim 1 wherein the second means comprises at least one chemical having a latent heat of fusion greater than 150 joules per gram.

4. A combination as defined in claim 1 further comprising:
    an insulating material in juxtaposition to said second wall of said second container, said insulating material being capable of moderating the temperature constant to a temperature of reduced magnitude for application to said object.

5. The combination as defined in claim 4 wherein said chemical comprises disodium monohydrogen phosphate dodecahydrate and said latent heat of fusion is absorbed substantially at a temperature of 36.1°C.

6. The combination as defined in claim 1 further comprising:
    at least one seal extending between the edges of said second container to form a plurality of compartments capable of containing said second means whereby the rupture of a single compartment does not result in the release of said second means from the remaining compartments; and
    said second means comprising at least one chemical having characteristics for undergoing a reversible change of state between the temperatures of 25°C and 45°C.

7. The combination as defined in claim 6 wherein said second means comprises at least one chemical having a latent heat of fusion greater than 150 joules per gram.

8. A reusable portable combination for transferring heat between an exterior source and an object at a substantially constant temperature comprising:
   chemical means having properties transferring heat between the exterior source and the object at the constant temperature over an extended period of time;
   a compartmentalized container for retaining said absorbing means in said compartments, said container being constructed of a material having a relatively high coefficient of heat transfer whereby transfer of heat or cold will readily occur between the exterior source and the object;
   a disposable non-allergenic covering capable of readily transferring heat between the exterior source and the object and substantially enclosing said container, said covering contacting said object whereby the heat transferred between said absorbing means and the object is readily imparted to said object through said container;
   at least one chemical stable in the presence of oxygen, a portion of said chemical being in solid form prior to the absorption of the heat;
   at least a portion of said solid chemical being capable of undergoing a first transformation to a liquid state at the contant temperature as the heat is absorbed;
   at least a portion of said liquefied chemical capable of undergoing a second transformation to a solid state at the constant temperature as the heat is imparted to said object; whereby
   said first and second transformation can be accomplished repeatedly whereby said combination is reusable,
   said transformations being accomplished within a temperature range of 25°C to 45°C.

9. A combination as defined in claim 8 wherein said transformations are accomplished within a temperature range of 0°C to −10°C.

10. A combination as defined in claim 8 wherein the amount of heat absorbed during the first transformation exceeds 150 joules per gram.

11. A combination as defined in claim 9 wherein the amount of heat absorbed during the first transformation exceeds 150 joules per gram.

* * * * *